Oct. 25, 1960 C. B. KIMBLE 2,957,245

ELECTRONIC RETICLE GENERATOR

Filed May 29, 1957 4 Sheets-Sheet 1

INVENTOR.
CREIGHTON B. KIMBLE
BY W R Mutty
Laurence S. Epstein
ATTORNEYS

Oct. 25, 1960 C. B. KIMBLE 2,957,245

ELECTRONIC RETICLE GENERATOR

Filed May 29, 1957

4 Sheets-Sheet 2

INVENTOR.
CREIGHTON B. KIMBLE
BY W.R. Maltby
Laurence S. Epstein
ATTORNEYS

Oct. 25, 1960 C. B. KIMBLE 2,957,245

ELECTRONIC RETICLE GENERATOR

Filed May 29, 1957 4 Sheets-Sheet 3

INVENTOR.
CREIGHTON B. KIMBLE

BY W R Maltby
Laurence S. Epstein
ATTORNEYS

INVENTOR.
CREIGHTON B. KIMBLE
BY
W R Mattis
Laurence S. Epstein
ATTORNEYS 2,957,245

ELECTRONIC RETICLE GENERATOR

Creighton B. Kimble, East Greenwich, R.I., assignor, by mesne assignments, to the United States of America as represented by the Secretary of the Navy Filed May 29, 1957, Ser. No. 662,553

14 Claims. (Cl. 33—49)

This invention relates to an electronic image generator and especially to an electronic gunsight-reticle generator.

The invention will be described with reference to an embodiment useful in one important field of application, namely, an electronic reticle generator for use in an aircraft gunsight. However, the invention is not to be considered as limited to this particular application or specific embodiment.

Reticle generators used at present in aircraft gunsights (for example, in the U.S. Air Force Mark 16 Fire Control System) are generally of the mechanical type and are rather expensive, both in original cost and in maintenance. The present invention generates a reticle image by means of conventional and simple electronic elements, thus providing a relatively inexpensive device which is considerably easier to adjust and maintain than the mechanical type of reticle generator.

The objects and advantages of the present invention are accomplished by generating a pair of electric waves having the proper characteristics, when utilized effectively in combination, to produce a suitable image upon a display device. The image is periodically intensified to form a desired pattern of bright dots, for example, a circular pattern with a dot at the center. Means are provided for varying the size and position of the pattern.

In the preferred embodiment, the display device is a projection-type, electrostatic cathode ray tube. A 60-cycle per second sine wave and a 30-cycle per second equilateral sawtooth wave are applied respectively to the vertical and horizontal deflection plates of the tube. The waves are in synchronism with each other and their amplitudes are variable in accordance with the wingspan and range of a target. Additional signals, representing the lead angle through which the guns of the aircraft must turn in order to shoot down the target, are applied to the display device in order to properly position the reticle image thereon. The reticle image is periodically intensified by a 240-cycle per second, asymmetrical square wave which is applied to the control grid of the tube.

A primary object of this invention is to provide an electronically generated image.

Another object of this invention is to provide an electronically generated reticle image employable in an aircraft gunsight.

A further object of this invention is to provide an electronic reticle generator which is relatively inexpensive in original cost and easy to adjust and maintain.

Figure 1:
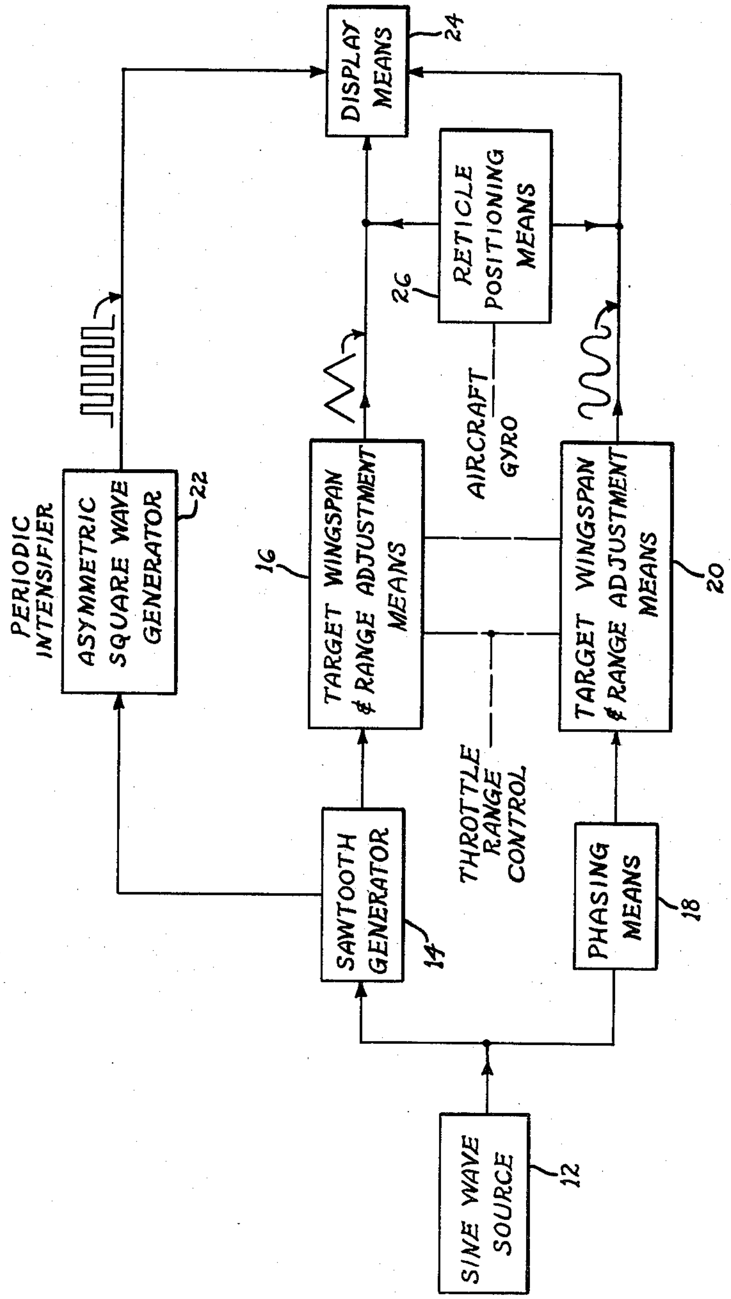

Other objects and many of the attendant advantages of this invention will be readily appreciated as same becomes better understood by the following detailed description when considered in connection with the accompanying drawings wherein:

Fig. 1 is a block diagram of a preferred embodiment, and

Figure 2A:
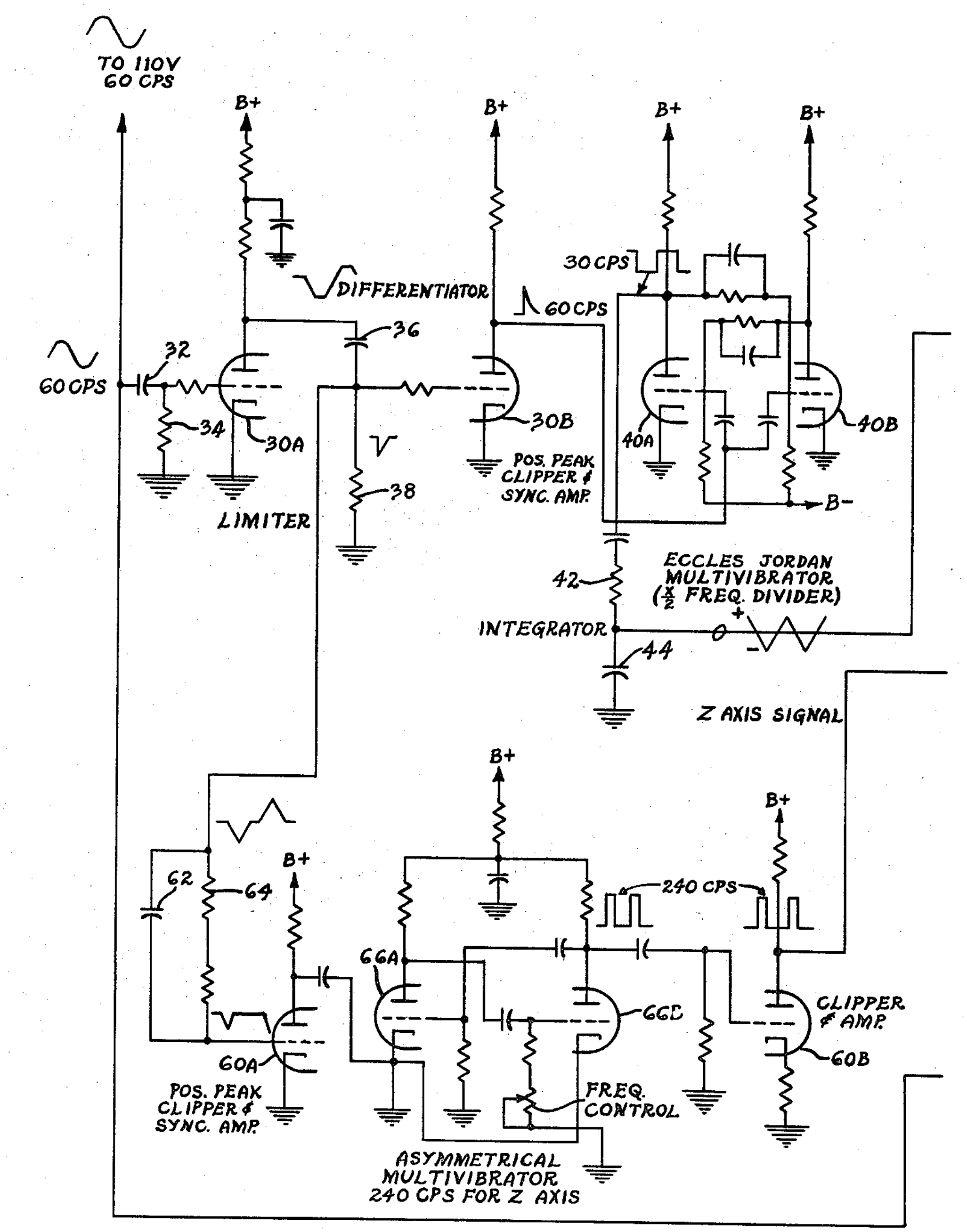
Figure 2B:
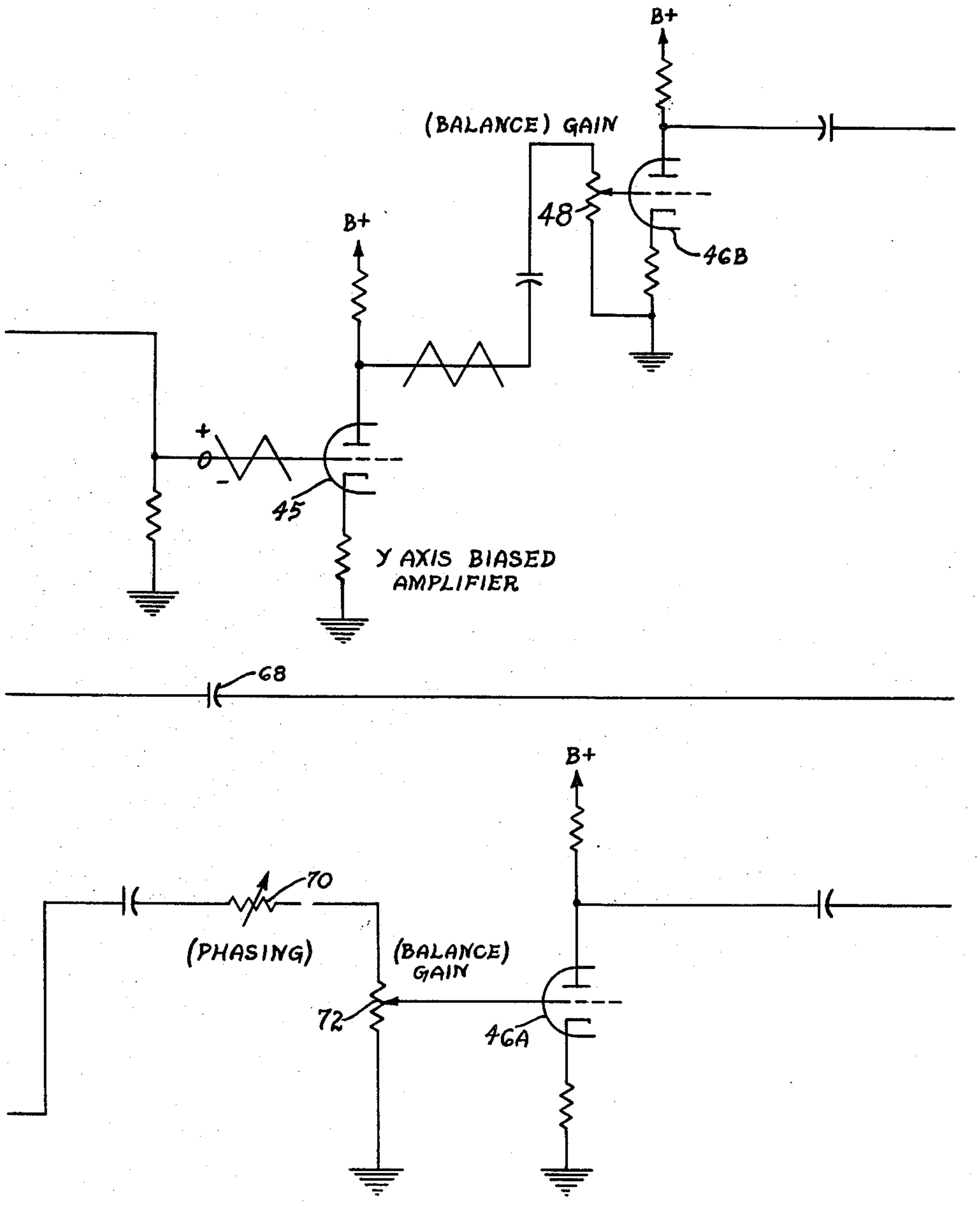
Figure 2C:
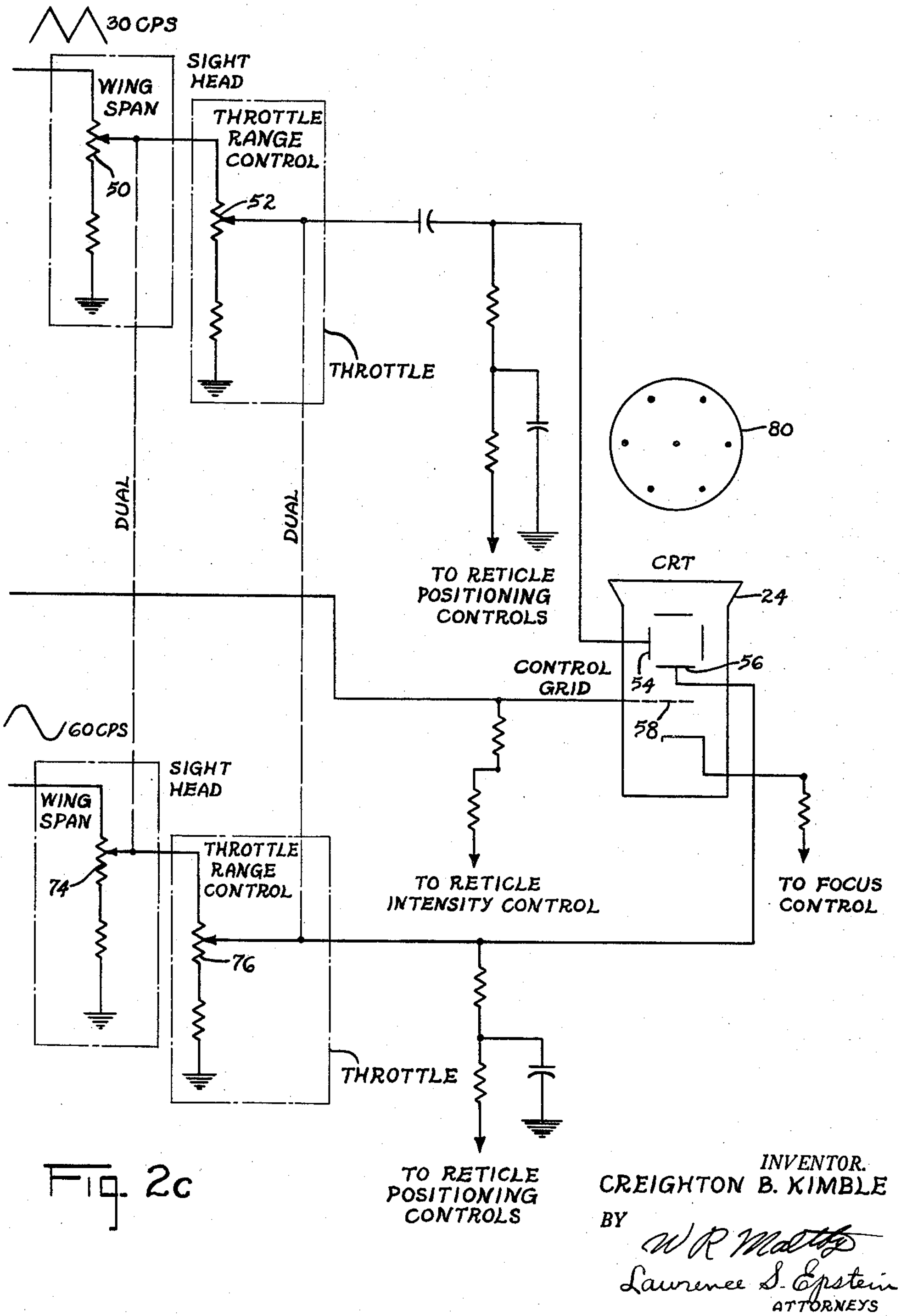

Figs. 2A, 2B and 2C compose a schematic circuit diagram of the embodiment illustrated in Fig. 1.

Fig. 1 illustrates a preferred embodiment of the invention which can be employed as a reticle generator for an aircraft gunsight of the type employed in the U.S. Air Force Mark 16 Fire Control System, for example, a sine wave source 12 feeds a sine wave to phasing means 18, by means of which the phase of the wave may be varied, and thence to target wing span and range adjustment means 20, by means of which the amplitude of the sine wave may be varied in accordance with the wing span and range of the target which the aircraft is pursuing.

The sine wave source 12 also feeds the sine wave to the sawtooth generator 14. The equilateral sawtooth output wave from the generator 14 is then coupled to target wingspan and range adjustment means 16 and to an asymmetric square wave generator 22, the output of which is coupled to display means 24.

The adjusted sawtooth wave and the adjusted sine wave outputs of the target wingspan and range adjustment means 16 and 20 are fed to the display means 24, as is also the output of the reticle positioning means 26.

The reticle positioning means 26 is arranged to be mechanically actuated by the gyroscope installed in the aircraft. The gyroscope provides a solution to the fire-control problem in terms of lead-angle information. Further information concerning the fire-control problem and its solution is provided in Chap. 5 of "The Handbook of Service Instructions for the Mark 16 Aircraft Fire Control System (Confidential)," a U.S. Bureau of Aeronautics publication, NAVORD OD9255 (vol. 2).

Fig. 2 shows the circuit details of Fig. 1. A 60-cycle sine wave voltage is applied to the control grid of triode 30A through coupling condenser 32. Triode 30A produces an amplified and clipped sine wave (roughly a square wave) which is applied to the grid of triode 30B through a differentiating circuit composed of capacitor 36 and resistor 38. Triode 30B acts as an amplifier for the negative half and as a clipper for the positive half of the differentiated input wave. The amplified pulses from triode 30B are then used as trigger pulses to control the frequency of the Eccles Jordan square wave generator comprising dual triode 40 and its associated resistance and capacitance components.

The 60-cycle trigger pulses are utilized to produce a 30-cycle square wave at the output of the Eccles Jordan circuit. This 30-cycle square wave is then integrated by resistor 42 and capacitor 44 to form a 30-cycle equilateral sawtooth wave. The equilateral sawtooth is amplified twice by triodes 45 and 46B.

The amplified sawtooth wave is then fed consecutively through wing span potentiometer 50 and range potentiometer 52. The contact arm of potentiometer 50 is manually movable to provide an amplitude adjustment of the sawtooth wave in accordance with the wingspan of a target and the contact arm of potentiometer 52 is mechanically coupled to the throttle range control to provide adjustment of the amplitude of the sawtooth wave in accordance with the range of the target. The doubly adjusted sawtooth wave is then applied to the horizontal deflection plates of an electrostatic, projection-type cathode ray tube 24.

The 60-cycle sine wave is also applied to the grid of triode 46A through a phase control, variable resistor 70, and a gain control, potentiometer 72. Gain control potentiometer 72 is similar to gain control potentiometer 48 at the control grid of triode 46B, both potentiometers being used as gain controls for calibration purposes. The phase control, variable resistor 70, is used to eliminate any phase difference between the sawtooth wave and the sine wave. The gain controls are used to achieve symmetry of the resultant wave form on the cathode ray tube 24. The amplified output of triode 46A is fed in series to the wing span and range potentiometers 74 and 76 which correspond to potentiometers 50 and 52. The adjusted sine wave is then applied to the vertical plates of the cathode ray tube 24. Degenerative-type amplifier stages are used to reduce the effects of line voltage variations and as isolating devices.

A portion of the differentiated, clipped, sine wave from triode 30A is coupled to the grid of triode 60A through a positive-peak clipping circuit consisting of capacitor 62 and resistor 64 in parallel. Since the positive pulses are clipped only the negative pulses are amplified and the resultant output of triode 60A is a 120-cycle positive pulse signal. This is utilized as a synchronizing signal to control the frequency of a 240-cycle multivibrator circuit comprising dual triode 66 and its associated resistance and capacitance components. The values of the resistors and capacitors are chosen so as to provide a pronounced asymmetrical square wave. The 240-cycle asymmetrical square wave is amplified by triode 60B and applied to the control grid of the cathode ray tube 24 through capacitor 68 to provide intensity modulation of the electron beam at a frequency of 240 times per second. Only the leading edge of the positive portion of each square wave has an intensifying effect on the electron beam, since capacitor 68 charges quickly as a result of its low capacitance value.

The image resulting from the quadrature combination of the sawtooth and sine waves in the cathode ray tube 24 is a horizontal figure 8. The intensity level of the cathode ray tube 24 is lowered beneath the threshold at which the image is visible so that only the bright spots resulting from the intensification of the electron beam can be seen. The result is a circle formed by six equally spaced dots, or pips, with a seventh dot in the center. Thus, a synthetic reticle image is created. A reticle image as it appears on the face 80 of the cathode ray tube 24 is shown immediately above the cathode ray tube 24.

The diameter of the circle is adjusted by means of the wingspan potentiometers 50 and 74 to enclose the tips of the wings of a selected type of target plane at a preselected range. The position of the circle on the face of the cathode ray tube 24 is variable in accordance with the lead angle necessary for the shooting down of a pursued target. This lead angle is the solution to the fire-control problem posed by the relative velocities of the aircraft and its target, the distance between them and various other ballistic factors. The fire-control problem is solved by means of a gyroscope in the aircraft. The positioning of the reticle image is accomplished by D.C. voltages derived from potentiometers mechanically coupled to the gyroscope and applied to the deflection plates of the cathode ray tube 24.

It should be noted that various modifications of the present invention are possible. For example, other wave forms may be utilized to form other desirable reticle patterns, and an electromagnetic-type cathode ray tube may be employed in place of the electrostatic type, if the proper driving waveforms are used.

Obviously many other modifications and variations of the present invention are possible in the light of the above teachings. It is therefore to be understood that within the scope of the appended claims, the invention may be practiced otherwise than as specifically described.

What I claim is:

1. An electronic device for generating a reticle image for a gunsight comprising in combination: a sine wave generator for generating an electrical wave, a second electrical wave generator, means for adjusting the amplitude of the sine wave in accordance with a measurement of and the range of a target, means for adjusting the amplitude of the output of said electrical wave generator in accordance with the measurement of and the range of said target, a projection-type cathode ray tube to which said adjusted waves are applied for display as a reticle image and means coupled to said cathode ray tube for positioning said displayed reticle image in accordance with information representing the solution of the fire control problem for said target.

2. An electronic device for generating a reticle image for a gunsight comprising in combination: a sine wave wave generator, an electrical wave generator the output of which has a frequency which is a submultiple of the sine wave frequency, means for adjusting the amplitude of the sine wave in accordance with the measurement of and the range of the target, means for adjusting the amplitude of the electrical wave generator output in accordance with the measurement of and the range of said target, a projection-type cathode ray tube to which said adjusted waves are applied for display as a reticle image, and means coupled to said cathode ray tube for positioning said displayed reticle image in accordance with information representing the solution of the fire-control problem for said target.

3. An electronic device for generating a reticle image for a gunsight comprising, in combination: an electrical function generator, a sawtooth wave generator the output of which has a frequency which is a submultiple of the output frequency of said electrical function generator frequency, means for adjusting the amplitude of the electrical wave generator output in accordance with the measurement of and the range of the target, means for adjusting the amplitude of the sawtooth wave in accordance with the measurement of and the range of the target, a projection-type cathode ray tube to which said adjusted waves are applied for display as a reticle image, and means coupled to said cathode ray tube for positioning said displayed reticle image in accordance with information representing the solution of the fire control problem for said target.

4. An electronic device for generating a reticle image for a gunsight comprising, in combination: a sine wave generator; an equilateral sawtooth wave generator the output of which has a frequency which is a submultiple of the sine wave frequency; means for adjusting the amplitude of the sine wave in accordance with a measurement of and the range of a target; means for adjusting the amplitude of the sawtooth wave in accordance with a measurement of and the range of said target; a projection-type cathode ray tube to which said adjusted waves are applied for display as a reticle image; and means coupled to said cathode ray tube for positioning said displayed reticle image in accordance with information representing the solution of the fire-control problem for said target.

5. A device as set forth in claim 4, including means coupled to said sine wave generator for varying the phase of said sine wave.

6. A device as set forth in claim 4, wherein said means for adjusting the amplitudes of said sine and sawtooth waves comprise potentiometers.

7. A device as set forth in claim 4, wherein said reticle image positioning means are potentiometers.

8. A device as set forth in claim 4, including means for periodically intensifying the electron beam of said cathode ray tube.

9. A device as set forth in claim 8, wherein said cathode ray tube is an electrostatic type having a pair of horizontal and a pair of vertical deflection plates, said adjusted sine wave is applied to the vertical plates, said sawtooth wave has half the frequency of said sine wave and is applied to the horizontal plates, and said means for periodically intensifying the electron beam of said cathode ray tube is an electronic generator producing an asymmetrical square wave having four times the frequency of said sine wave.

10. An electronic device for generating a reticle image for a gunsight mounted in an aircraft comprising, in combination: connection means for a source of sine waves; an equilateral sawtooth wave generator, the frequency of the sawtooth waves being a sub-multiple of the frequency of the sine waves; means for adjusting the amplitude of the sine waves in accordance with a measurement of and the range of a target; means for adjusting the amplitude of the sawtooth wave in accordance with a measurement and the range of said target; a projection-type cathode ray tube to which said adjusted waves are applied for display as a reticle image; and means coupled to said cathode ray tube for positioning said displayed reticle image in accordance with information representing the solution of the fire-control problem for said target.

11. A device as set forth in claim 10, wherein said means for adjusting the amplitude of the sine wave and said sawtooth waves adjusts said sine wave and said sawtooth waves in accordance with target range and target wing span.

12. A device as set forth in claim 10, wherein the sine and sawtooth waves are synchronized by coupling the sine wave to the sawtooth wave generator as an input, and including phasing means coupled to said connection means for varying the phase of said sine wave.

13. A device as set forth in claim 10, including means for periodically intensifying the electron beam of said cathode ray tube.

14. A device as set forth in claim 13, wherein said cathode ray tube is an electrostatic type having a pair of horizontal and a pair of vertical deflection plates, said adjusted sine wave being applied to said vertical pair and said adjusted sawtooth wave being applied to said horizontal pair, and said periodic intensifying means comprises an assymmetrical square wave generator having an output whose frequency is four times that of said sine wave.

References Cited in the file of this patent

UNITED STATES PATENTS

| | | |
|---|---|---|
| 2,165,770 | Tolson | July 11, 1939 |
| 2,292,045 | Burnett | Aug. 4, 1942 |
| 2,380,929 | Ahier et al. | Aug. 7, 1945 |
| 2,380,929 | Ahier et al. | Aug. 7, 1945 |
| 2,416,591 | Muntz et al. | Feb. 25, 1947 |
| 2,436,655 | Locke | Feb. 24, 1948 |
| 2,440,268 | Hardy | Apr. 27, 1948 |
| 2,455,963 | Wheeler | Dec. 14, 1948 |
| 2,459,206 | Wheeler | Jan. 18, 1949 |
| 2,512,703 | Wilkerson | June 27, 1950 |
| 2,570,298 | Wheeler | Oct. 9, 1951 |
| 2,717,330 | Meagher et al. | Sept. 6, 1955 |
| 2,873,405 | Iwerks | Feb. 10, 1959 |